United States Patent
Brodt et al.

(10) Patent No.: US 10,838,963 B2
(45) Date of Patent: Nov. 17, 2020

(54) OPTIMIZED ACCESS FOR HIERARCHICAL LOW CARDINALITY VALUE SYNOPSIS IN ANALYTICAL DATABASES

(71) Applicant: INTERNATIONAL BUSINESS MACHINES CORPORATION, Armonk, NY (US)

(72) Inventors: Andreas Brodt, Gerlingen (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 15/700,514

(22) Filed: Sep. 11, 2017

(65) Prior Publication Data

US 2019/0079976 A1    Mar. 14, 2019

(51) Int. Cl.
| | |
|---|---|
| *G06F 17/00* | (2019.01) |
| *G06F 16/2455* | (2019.01) |
| *G06F 16/22* | (2019.01) |
| *G06F 16/16* | (2019.01) |
| *G06F 16/2457* | (2019.01) |
| *G06F 16/2458* | (2019.01) |

(52) U.S. Cl.
CPC ...... *G06F 16/24557* (2019.01); *G06F 16/162* (2019.01); *G06F 16/22* (2019.01); *G06F 16/2255* (2019.01); *G06F 16/24578* (2019.01); *G06F 16/2282* (2019.01); *G06F 16/2465* (2019.01)

(58) Field of Classification Search
CPC .... G06F 16/283; G06F 16/22; G06F 16/2282; G06F 16/24557; G06F 16/278; G06F 16/285

See application file for complete search history.

(56) References Cited

U.S. PATENT DOCUMENTS

| | | | |
|---|---|---|---|
| 8,626,725 B2 | 1/2014 | Netz et al. | |
| 9,442,694 B1 | 9/2016 | Boehme et al. | |
| 9,501,534 B1 | 11/2016 | Brodt et al. | |
| 2009/0106210 A1 | 4/2009 | Slezak et al. | |
| 2011/0246432 A1 | 10/2011 | Yang et al. | |
| 2012/0254199 A1 | 10/2012 | Kuno et al. | |
| 2014/0095502 A1 | 4/2014 | Ziauddin et al. | |
| 2014/0095520 A1 | 4/2014 | Ziauddin et al. | |

(Continued)

OTHER PUBLICATIONS

Beier et al., U.S. Appl. No. 15/161,396, filed May 23, 2016, titled "Extreme Value Computation,", pp. 1-41.

(Continued)

*Primary Examiner* — Truong V Vo
(74) *Attorney, Agent, or Firm* — Jordan T. Schiller (57) ABSTRACT

The present disclosure relates to a computer-implemented method for processing a data table. The data table comprises a set of attributes. The method comprises storing the data table on one or more data blocks consisting of one or more sub-blocks. The method comprises determining distinct values of at least one attribute for the one or more sub-blocks relating to a respective data block of the one or more data blocks. The method further comprises storing information indicating the distinct values as hierarchical attribute value information for the respective data block. The hierarchical attribute value information indicates a presence of the distinct values in the one or more sub-blocks.

20 Claims, 2 Drawing Sheets

(56) References Cited

U.S. PATENT DOCUMENTS

| | | | |
|---|---|---|---|
| 2015/0199407 | A1 | 7/2015 | Ziauddin et al. |
| 2015/0286681 | A1 | 10/2015 | Baer et al. |
| 2015/0286682 | A1 | 10/2015 | Ziauddin |
| 2015/0347426 | A1 | 12/2015 | Dickie et al. |
| 2015/0363447 | A1 | 12/2015 | Dickie |
| 2016/0098451 | A1 | 4/2016 | Dickie |
| 2016/0188623 | A1* | 6/2016 | Finlay ............... G06F 16/2255 707/690 |
| 2016/0283140 | A1* | 9/2016 | Kaushik ............... G06F 3/0643 |
| 2017/0116292 | A1 | 4/2017 | Boehme et al. |
| 2017/0139617 | A1 | 5/2017 | Boehme et al. |
| 2017/0139943 | A1 | 5/2017 | Boehme et al. |

OTHER PUBLICATIONS

Bloom, "Space/Time Trade-offs in Hash Coding with Allowable Errors," Communications of the ACM, Jul. 1970, p. 422-426, vol. 13, Issue 7.

Bonomi et al., "An Improved Construction for Counting Bloom Filters," Algorithms—ESA 2006, 2006, p. 684-695, LNCS 4168, Springer-Verlag Berlin Heidelberg.

Oracle, "Using Zone Maps," Oracle Database Data Warehousing Guide, p. 1-24, Oracle Database Online Documentation 12c Release 1 (12.1), Chapter 13, http://docs.oracle.com/database/121/DWHSG/zone_maps.htm#DWHSG9355, Accessed on Apr. 29, 2016.

Raman et al., "DB2 with BLU Acceleration: So Much More than Just a Column Store," Proceedings of the VLDB Endowment, vol. 6, No. 11, Aug. 26-30, 2013, Riva del Garda, Trento, Italy, Copyright 2013 VLDB Endowment, pp. 1-12.

IBM, "IBM PureData—Netezza Developer Network (NDN)," IBM DeveloperWorks, Understanding Netezza Zone Maps, https://www.ibm.com/developerworks/community/blogs/Wce085e09749a_4650_a064_bb3f3b738fa3/entry/understanding_netezza_zone_maps?lang=en, May 22, 2014, Printed on Sep. 1, 2017, pp. 1-3.

Bayliss et al., "Zone Map and Attribute Clustering Examples," Oracle Data Warehousing and Very Large Databases, Last Modified on Jul. 31, 2014, p. 1-3, GitHub, Inc., https://github.com/oracle/dw-vldb/tree/master/att_clu_zone_map, Accessed on Apr. 29, 2016.

Gardi, "Efficient Algorithms for Disjoint Matchings among Intervals and Related Problems," Discrete Mathematics and Theoretical Computer Science, 2003, p. 168-180, LNCS 2731, Springer-Verlag Berlin Heidelberg.

Ślęzak, "Brighthouse: An Analytic Data Warehouse for Ad-hoc Queries," PVLDB '08, Aug. 23-28, 2008, p. 1337-1345, VLDB Endowment, ACM, Auckland, New Zealand.

Oracle, "Partition Pruning with Zone Maps," Oracle Database VLDB and Partitioning Guide, p. 1-2, Oracle Database Online Documentation 12c Release 1 (12.1), Chapter 3, https://docs.oracle.com/database/121/VLDBG/GUID-65DA5654-970B-4056-BFBF-C300C9A8AA2A.htm#VLDBG14101, Accessed on May 2, 2020.

Oracle, "Attribute Clusters and Zone Maps," Oracle Database 12c Tutorial, p. 1-27, http://www.oracle.com/webfolder/technetwork/tutorials/obe/db/12c/r1/12c_aczm/12c_aczm.html, Accessed on May 4, 2016.

Ensslen, "Redshift Zone Maps as an 'Indexing' Strategy," Optimal Business Intelligence Blog, Dec. 8, 2014, p. 1-4, OptimalBI Ltd., http://optimalbi.com/blog/2014/12/08/redshift-zone-maps-as-an-indexing-strategy/, Accessed on Apr. 29, 2016.

* cited by examiner

OPTIMIZED ACCESS FOR HIERARCHICAL LOW CARDINALITY VALUE SYNOPSIS IN ANALYTICAL DATABASES

BACKGROUND

The present invention relates to the field of digital computer systems, and more specifically, to a method for processing a data table.

Analytical database systems manage very large amounts of data and are optimized for queries that read large portions of it. At the same time, they offer the complete querying power of SQL. However, there is a continuous need to improve access to such data, in particular to data organized in a hierarchical structure.

SUMMARY

Various embodiments of the present invention provide a method for processing a data table, a computer system for processing a data table, and a computer program product for processing a data table as described by the subject matter of the independent claims. Advantageous embodiments of the present invention are described in the dependent claims. Embodiments of the present invention can be freely combined with each other if they are not mutually exclusive.

In one embodiment, the present invention relates to a computer-implemented method for processing a data table, the data table having a set of attributes. The method comprises storing the data table on one or more data blocks consisting of one or more sub-blocks. The method further comprises determining distinct values of at least one attribute for the one or more sub-blocks relating to a respective data block of the one or more data blocks. The method comprises storing information indicating the distinct values as hierarchical attribute value information for the respective data block, the hierarchical attribute value information indicates a presence of the distinct values in the one or more sub-blocks.

In another embodiment, the present invention relates to a computer program product for processing a data table, the data table having a set of attributes, the computer program product comprising a computer-readable storage medium having computer-readable program instructions embodied therewith, the computer-readable program instructions executable by an electronic device to cause the electronic device to perform a method that comprises storing the data table on one or more data blocks consisting of one or more sub-blocks. The method further comprises determining distinct values of at least one attribute for the one or more sub-blocks relating to a respective data block of the one or more data blocks. The method comprises storing information indicating the distinct values as hierarchical attribute value information for the respective data block, the hierarchical attribute value information indicates a presence of the distinct values in the one or more sub-blocks.

In another embodiment, the present invention relates to a computer system for processing a data table, the data table having a set of attributes. The system is configured for storing the data table on one or more data blocks consisting of one or more sub-blocks. The system is further configured for determining distinct values of at least one attribute for the one or more sub-blocks relating to a respective data block of the one or more data blocks. The system is configured for storing information indicating the distinct values as hierarchical attribute value information for the respective data block, wherein the hierarchical attribute value information indicates a presence of the distinct values in the one or more sub-blocks.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The hierarchical attribute value information may be descriptive of the attribute. Using the hierarchical attribute value information, a preselection of data blocks and sub-blocks of the data table may be performed before scanning the preselected sub-blocks. The hierarchical attribute value information may comprise information or metadata on the attribute that allows such a preselection. For example, the hierarchical attribute value information may comprise, or indicate, all the distinct values of a data block and their presence in sub-blocks of the data block. A received query requiring a range of values or certain values may be processed by selecting data blocks whose distinct values fulfill the query condition using the hierarchical attribute value information. The hierarchical attribute value information of the selected data blocks may be further used to select sub-blocks of the selected data blocks whose distinct values fulfill the query condition. Those selected sub-blocks may be scanned for evaluating the received query.

The present method may have the advantage of reducing false positives (i.e. data blocks which must be searched, but do not contain any relevant rows for a query) which may save processing resources that would otherwise be required by data blocks being scanned in vain. The present method may particularly be advantageous for data with a low number of distinct values because the false positive rate becomes important for a low number of distinct values.

Another advantage may be that the present method may enable a more effective access structure comprising the hierarchical attribute value information to avoid multiple accesses at different hierarchy levels. This may also provide a more compact storage representation of the value sets. The present method may improve storage locality and avoid several lookup phases in hierarchically organized data.

According to one embodiment, the hierarchical attribute value information comprises an attribute information set for each of the data block and the sub-blocks, wherein each attribute information set comprises distinct values of the respective data block or sub-block. For example, the hierarchical attribute value information, in addition to information indicative of the hierarchy of the data blocks and the sub-blocks, an efficient selection and thus processing of the data may be achieved. For example, each data block and sub-block may be associated with information indicating that it is a data-block or it is a sub-block of a given data block.

According to one embodiment, each indicated distinct value of the hierarchical attribute value information being encoded into one or more bits of a Bloom filter vector, wherein the hierarchical attribute value information of each data block of the data table comprises the Bloom filter vector as an indication of the distinct values.

This embodiment may particularly be advantageous in case of a high number of distinct values per data block. The selection efficiency of the data blocks using the distinct values may be higher and, thus, avoid unnecessary scanning of selected data blocks that may not contain desired records.

The Bloom filter can be employed to approximate or indicate the set of distinct values in case the number of distinct values is too large for listing them completely, but not large enough to overflow a small bloom filter of, e.g., 32 or 64 bits. The Bloom filter may store a fixed amount of bits, which are either set to 1 or 0, thereby encoding a set of values. The 1-bits have originally been calculated using one or more hash functions over the values that are stored in the data blocks (each value sets specific one or more bits). A 1-bit might have been set by multiple values that are inside the data block. This may be calculated by determining a list of all values that might have set all 1-bits in the Bloom filter (candidates).

In another example, if the number of distinct values is sufficiently small (e.g. smaller than a predefined threshold number), the distinct values occurring in a particular data block may be listed in the corresponding hierarchical attribute value information.

According to one embodiment, the hierarchical attribute value information of a given data block of the data table comprises a bit vector in association with each bit of the Bloom filter vector of the given data block, the bit vector comprising a bit for each sub-block of the given data block, the method further comprising: setting bits of the bit vector for indicating the presence of a distinct value in sub-blocks associated with the set bits. For example, the method further comprises upon receiving a request for accessing a given distinct value, identifying bits of the Bloom filter vector that represent the (or bits that are set for) given distinct value, selecting bit vectors associated with the identified bits and performing a bitwise AND operation between the selected bit vectors, resulting in a result bit vector, and scanning the sub-blocks associated with bits set to 1 in the result bit vector for executing the request.

The lists of distinct values may be augmented by a list of bit vectors. Every value may be paired with one or more bit vectors that indicate which sub-blocks of the current data block contain the value. This way, the subordinate data blocks that are relevant for a particular query can directly be identified from their parent's attribute value information entry. The subordinate data blocks do not require a separate entry for corresponding attribute value information. For example, a distinct value "Val1" occurring in sub-block 1 and sub-block 8, only, of a given data block. "Val1" is mapped to the Bloom filter vector, which corresponds to bit 2 and bit 7 being set in the Bloom filter vector. For accessing the value "Val1", the bit vectors for bit 2 and bit 7 may be identified respectively. The bits for sub-block 1 and sub-block 8 are set in both identified bit vectors. At query time, a search for the value "Val1" may involve the bit vectors for the Bloom filter bit 2 and bit 7 being extracted and bitwise AND'd. The result is the list of sub-blocks that (potentially) contain the value "Val1".

Using the bit vectors, and knowing the organization of the data block hierarchy, scan lists may be determined where the scan lists comprise indications of the physical storage unit where content of the data blocks are stored (e.g. a disk). The scan lists may be processed in order to improve I/O operations. For example, the identifiers of the physical storage units may be sorted and read with a single I/O operation. For example, for data blocks defined by physical storage units, every bit position can be directly translated using a multiple of the storage units with the beginning of the parent data block as a start offset. Data blocks of fixed-size row numbers can be translated using a multiple of the row number for every bit position. Only in case the data blocks may have variable length, a separate lookup structure may be required that reports the scan position given the index of a sub-block. In other terms, for fixed-size data blocks, a mathematical calculation may provide the number of "physical storage units" and their index. For variable-sized data blocks, an additional indirection may be used as a data block may be stored on multiple physical storage units.

In another example, each indicated distinct value of the hierarchical attribute value information may be encoded into one or more bits of a bit vector, wherein the hierarchical attribute value information of each data block of the data table comprises the bit vector as an indication of the distinct values. And, the hierarchical attribute value information of a given data block of the data table comprises a Bloom filter vector in association which each distinct value of the given data block. The Bloom filter vector comprises a bit representing one or more sub-blocks of the given data block. The method further comprises setting bits of the Bloom filter vector for indicating the presence of a distinct value in sub-blocks associated with the set bits. For example, the bit vectors are provided on the block level and the Bloom filter is provided on the sub-block level. This may be advantageous in particular if the storage space for hierarchical attribute value information on the sub-block level shall be minimized For example, 1024 bits may be available on the block level, and only 128 bits may be available at the sub-block level. In such a case, the bit vector on the block level may be sufficient, but the 128 bits on the sub-block level does not allow for the storage of individual bits. The Bloom filter vector is used for compaction of information.

In another example, each indicated distinct value of the hierarchical attribute value information may be encoded into one or more bits of a Bloom filter vector, wherein the hierarchical attribute value information of each data block of the data table comprises the Bloom filter vector as an indication of the distinct values. And, the hierarchical attribute value information of a given data block of the data table comprises another Bloom filter vector in association with each bit of the Bloom filter vector of the given data block. In this case, and with reference to the above example, for accessing the distinct value "Val1", the value "Val1" is first mapped to the block level Bloom filter. The mapping results in multiple Bloom filter bits being set, which identify respective multiple sub-block level Bloom filters. Those sub-block level Bloom filters can be bitwise AND'd. The resulting vector of the bitwise operation is used to iterate over all sub-block numbers/index and map them to the resulting vector. If the sub-blocks bits are all set in the resulting vector, then the sub-block qualifies and may potentially contain the requested value and, thus, may be scanned and processed. The bitwise AND operation may particularly be advantageous for cases where the same Bloom filter algorithm and parameters are used for the two Bloom filter vectors of the data blocks and the sub-blocks, respectively.

According to one embodiment, the method further comprises storing the Bloom filter vectors in one or more respective processor registers, and processing the content of the one or more respective processor registers for evaluating a query on the data table, wherein the query has a selection condition on the at least one attribute.

The Bloom filter technique may, for example, make use of single instruction multiple data (SIMD) operation offered in processors. For example, the Bloom filter vector can be stored in a SIMD register, which may exceed 1024 bytes in more recent processors (i.e. easily sufficient). The bits relevant to the query predicates are looked up in the Bloom filter. This can be done, for example, using an AND operation. For every relevant bit that was found to be set, the searched value is likely contained in the data block. The number of the bit may be determined as the number of set bits before this one. This bit number may be the corresponding index in a bit vector array comprising the bit vectors. The bit number may, for example, be determined in two steps. First, all bits higher than the current bit are masked to 0, including the bit itself. Second, the number of 1-bits is counted. The processor may have machine instructions, such as POPCNT (population count), to do this in hardware level. The result is the bit number and, thus the array index, to retrieve the relevant bit vector.

According to one embodiment, the method further comprises deleting the bit vectors, in response to determining that a predefined number of the one or more bits of all bit vectors of a given data block are set.

According to one embodiment, the predefined number of bits is the number of bits in a bit vector of the given data block.

In case the system detects that all bit vectors of a data block are entirely 1, the bit vectors may not be of any use. In this case, the system may not keep the bit vectors. This may be advantageous for the case of even value distributions. In order to compromise scan efficiency for attribute value information efficiency, the bit vectors can already be eliminated if nearly all bit vectors are almost entirely 1.

According to one embodiment, the hierarchical attribute value information further comprises the extremum values, min, max of the attribute in each respective data block of the data table.

This embodiment may be advantageous in particular for larger sets of distinct values that can be represented using a Bloom filter. In this case, the full value list of the distinct values may not be available. However, a set of candidate values may be computed. Bloom filters map each value to a particular bit position in a bit vector using a hash function. Collisions may occur (i.e. several values may be mapped to the same bit position), and because of this it may not be clear which value caused a particular bit to be set, but a set of candidate values can be computed that could have caused the bit to be set. Thus, for every 1-bit in the Bloom filter, the set of values has to be computed that is mapped to the respective bit position. Naturally, the candidate values are limited to the min/max range given by the extremum values of the attribute value information.

According to one embodiment, a data block of the data table comprises a predefined physical storage unit or a fixed number of records.

According to one embodiment, the attribute being a multi-value attribute, a first value and a second value, wherein the distinct values are distinct first values, and wherein the hierarchical attribute value information indicates the distinct first values and the sub-blocks of the respective data block having a second value associated with the distinct first values.

Figure 1:
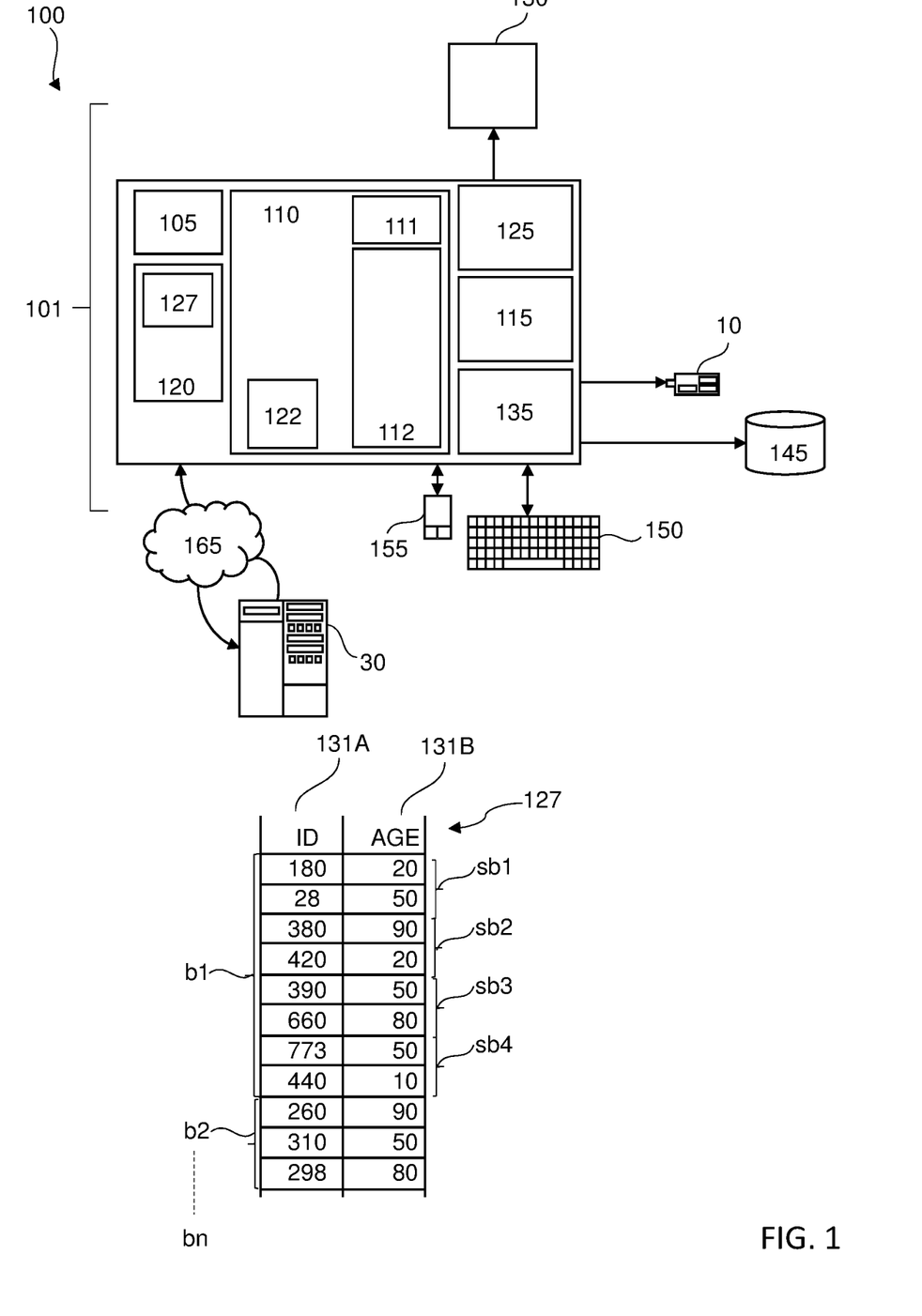
FIG. 1 represents a computerized system, suited for implementing one or more method steps, in accordance with an embodiment of the present disclosure.

FIG. 1 represents a general computerized system, suited for implementing method steps, in accordance with an embodiment of the present disclosure.

It will be appreciated that the methods described herein are at least partly non-interactive, and automated by way of computerized systems, such as servers or embedded systems. In exemplary embodiments, however, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and are executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM)). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program or software 112, executable program or software 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein.

In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one data table (or data set) 127. For example, the software 112 may receive (automatically or upon request) as input the data table 127, or may download the data table 127 from storage 120 or memory 110.

The data table 127 may comprise one or more columns 131A-B, wherein each column is represented by a respective attribute (e.g. "ID" 131A and "Age" 131B). The rows of the data table 127 may each comprise values of the attributes 131A-B. The data table 127 may for example comprise or may be stored on multiple (e.g. contiguous) data blocks b1-bN.

The term "data block" as used herein may refer to a logical or physical storage for storing the data of the data table.

For example, as illustrated in FIG. 1, the data table 127 may be divided or split or assigned to data blocks b1-bN using the number of rows in the data table 127.

In another example, the data table 127 may be split or divided based on storage size such that each data block b1-bN contains, or is assigned, to one or more storage units (e.g. data pages). The term "storage unit" as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on a disk (e.g. 4 KB). Other storage units having different granularities may be addressable or used in order to store data (e.g. in the storage 120). For example, different storage levels may be used for storing the data. Storage levels comprise containers and extents, wherein extents can be defined in terms of number of data pages, while a container can be defined in terms of number of extents. For example, a data block may represent an extent, and a sub-block may represent a data page.

The rows of each data block (e.g. b1 of the data table 127) may be stored on contiguous, linked, or indexed disk units (e.g. of storage 120) that form the corresponding data pages of the data block b1. The term disk unit refers to the minimum addressable unit, on storage 120. For example, a disk unit may have a size of 512 bytes. The data blocks b1-bN may or may not comprise the same number of data pages.

Each data block may be split into respective sub-blocks. As shown in FIG. 1, the rows of the data blocks b1 may be stored on, or may belong to, separate sub-blocks sb1-sb4.

The term "data table", or data set, as used herein refers to a collection of data that may be presented in tabular form. Each column in the data table may represent a particular variable or attribute. Each row in the data table may represent a given member, record, or entry of the data table.

Each data block b1-bN of the data table 127 may be associated with hierarchical attribute value information of one or more attributes of the data table, e.g. attribute 131B. For example, the hierarchical attribute value information comprises information of the attribute 131B. For example, the hierarchical attribute value information may be saved together with the data block to which it is associated, which is an indication that they both correspond to each other. In another example, the hierarchical attribute value information may be stored (e.g. in a table) separately from the associated data block and have pointers/addresses or links to the associated data block.

The hierarchical attribute value information is indicative of covering all values of a data block. The hierarchical attribute value information of a data block may comprise all distinct values of the attribute 131B of the data block. In addition, or alternatively, the hierarchical attribute value information of a data block may comprise one or more ranges of values of the attribute 131B that are in the data block. In addition, the hierarchical attribute value information is indicative of sub-blocks that contain the distinct values.

For data block b1, the hierarchical attribute value information may, for example, comprise a list of distinct values of b1, namely 10, 20, 50, 80 and 90 and a list of sub-blocks to which each of the distinct values belong. For example, the hierarchical attribute value information may indicate that the distinct value 20 belongs to sub-blocks sb1 and sb2, the distinct value 50 belongs to sub blocks sb1, sb3, and sb4, the distinct value 10 belongs to sub-block sb4, distinct value 80 belongs to sub-block sb3, and distinct value 90 belongs to sub-block sb2.

The hierarchical attribute value information may for example be computed in three steps: (1) The sets of distinct values for the sub-blocks are computed; (2) Then the value sets of the children (e.g. sb1-sb4) of the same parent data block (e.g. b1) are merged recursively to compute the sets of distinct values for the entire hierarchy of data blocks, possibly up to the level of the entire table column representing the attribute (e.g. 131B); and (3) At any point in the hierarchy it may be checked: whether full value lists can be kept or whether to fall back to the Bloom filter technique. In other terms, if the number of distinct values is smaller than a predefined threshold, all distinct values may be stored (e.g. as a bit), otherwise a Bloom filter vector may be used to indicate the distinct values.

While FIG. 1 only shows a few attributes and data blocks, it will be appreciated that numerous attributes and/or data blocks may exist or may be used with the present method.

Figure 2:
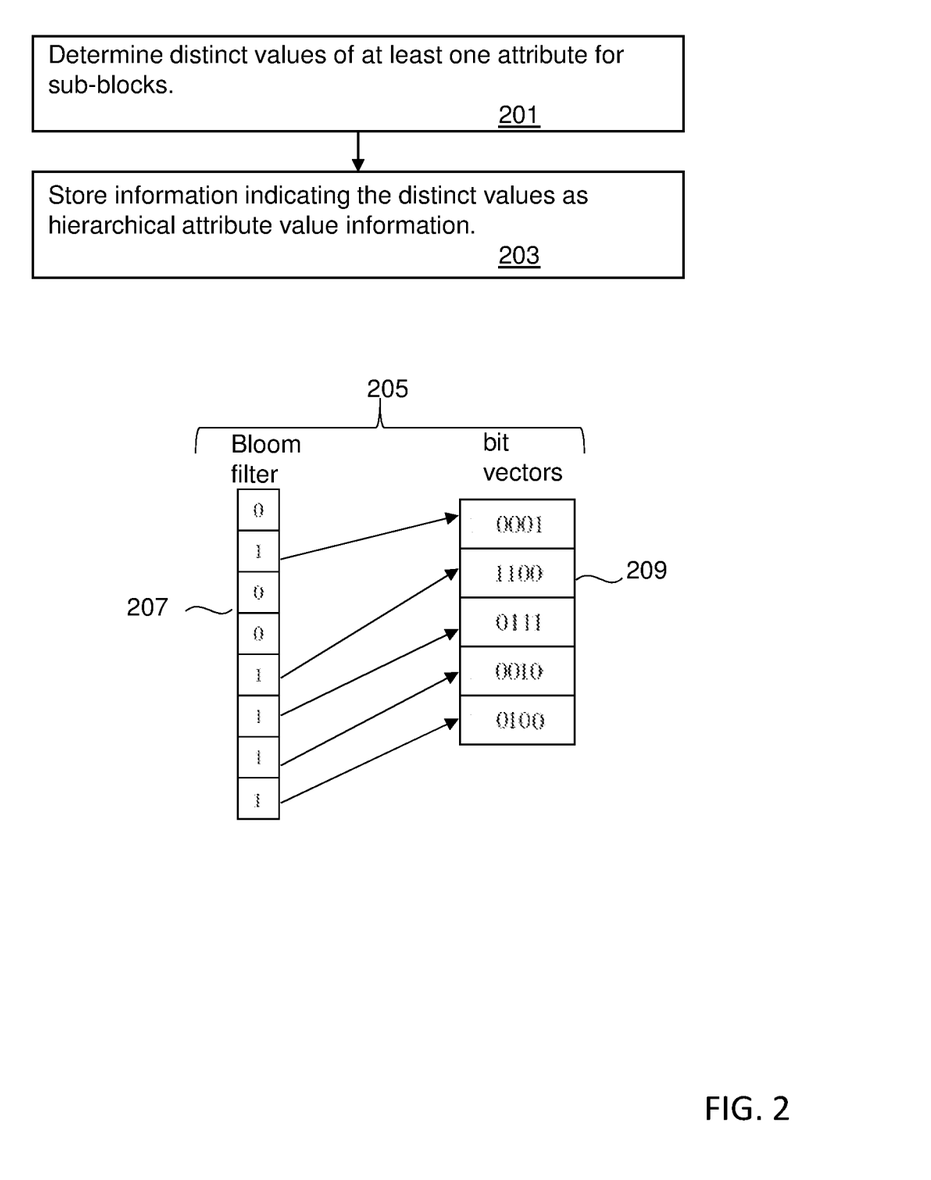
FIG. 2 is a flowchart of a method for sorting a data table, in accordance with an embodiment of the present invention.

FIG. 2 is a flowchart of a method for processing a data table (e.g. data table 127). The data table 127 is stored on multiple data blocks b1-bN consisting of sub-blocks (e.g. sb1-sb4).

In step 201, distinct values of at least one attribute (e.g. attribute 131B) may be determined for sub-blocks (e.g. sb1-sb4) relating to a respective data block (e.g. b1) of the data blocks b1-bN. For example, it may be determined that 10, 20, 50, 80 and 90 are distinct values of the attribute 131B for sub-blocks sb1-sb4.

In step 203, information may be generated indicating the distinct values (e.g. 10, 20, 50, 80 and 90) as hierarchical attribute value information 205 for the respective data block (e.g. b1). The hierarchical attribute value information 205 indicates the distinct values and their presence in the sub-blocks. This may for example be performed for a data block (e.g. b1) as follows. Each distinct value of the distinct values (10, 20, 50, 80 and 90) of the hierarchical attribute value information 205 may be encoded in a Bloom filter vector 207. In addition, the hierarchical attribute value information of data block b1 may comprise a bit vector in association with each distinct value of the data block b1. This results in an array 209 of bit vectors. The size of the bit vector is the number of sub-blocks sb1-sb4 of the data block b1, such that the bit vector comprises a bit for each sub-block of the data block b1. For example, the first bit (most significant bit) of the bit vector corresponds to sub-block sb1, the second bit of the bit vector corresponds to sub-block sb2, the third bit of the bit vector corresponds to sub-block sb3, and the fourth bit of the bit vector corresponds to sub-block sb4.

In this example of data block b1, the bit vector comprises 4 bits. Each bit of the bit vector may be set to indicate the presence of a distinct value in the sub-block associated with that sub-block. Following the example of data block b1, the hierarchical attribute value information of b1 may comprise a 5 bit vector for the respective distinct values 10, 20, 50, 80, and 90.

For distinct value 10, the bit vector may be as follows 0001. Only the fourth bit is set because distinct value 10 is only present in sub-block sb4 that corresponds, or is represented by, the fourth bit.

For distinct value 20, the bit vector may be as follows 1100. Only the first and second bits are set because distinct value 20 is only present in sub-blocks sb1 and sb2 that correspond, or are represented by, the first and second bits respectively.

For distinct value 50, the bit vector may be as follows 0111. Only the second, third, and fourth bits are set because distinct value 50 is only present in sub-blocks sb2, sb3, and sb4 that correspond, or are represented by, the second, third, and fourth bits respectively.

For distinct value 80, the bit vector may be as follows 0010. Only the third bit is set because distinct value 80 is only present in sub-block sb3 that corresponds, or is represented by, the third bit.

For distinct value 90, the bit vector may be as follows 0100. Only the second bit is set because distinct value 90 is only present in sub-block sb2 that corresponds, or is represented by, the second bit.

For example, as shown in FIG. 2, every set bit in the Bloom filter vector 207 is annotated with a bit vector denoting the affected sub-blocks. The values of the depicted data block (e.g. b1) are approximated in a Bloom filter of eight bits. The 1-bits may be calculated using a hash function over the values that are stored in the data blocks (each value sets a specific bit). A 1-bit might have been set by multiple values that are inside the data block. For every set bit, a bit vector is stored which denotes the relevant sub-blocks. In the example of FIG. 2, the bits of the Bloom filter vector 207 are by respective distinct values 10, 20, 50, 80 and 90. For instance, a value of "AGE" 131B with a hash value of 1 (i.e. 10) is to be found only in the fourth sub-block. If a bit in the Bloom filter is set by the values 10 and 20, then a query searching for the values 10 may require a scan of the sub-blocks identified in the bit vector for that (Bloom filter) bit. Likewise, a query for the value 20 may require a scan of those sub-blocks. Bloom filters typically set multiple bits for a value so that, for example, value 10 may result in bit 1 and bit 5 being set, while value 20 causes bit 1 and bit 7 to be set. A query searching for 10 may involve a bitwise AND operation between the bit vectors for (Bloom filter) bit 1 and (Bloom filter) bit 5 and a scan of the resulting sub-blocks. A search for value 20 may involve a bitwise AND operation between the bit vectors associated with bit 1 and bit 7. Thus, the chance of false positives may be reduced.

Although only two hierarchy levels (data blocks refer to a first level, and sub blocks refer to a lower second level), the present method is not restricted to hierarchies of two levels. There can be arbitrary numbers of levels in the hierarchy. In this case, a second lookup phase may be required. The present method may represent two hierarchy levels in a single structure (comprising the hierarchical attribute value information). This way, a three level hierarchy can be represented by two levels of hierarchical attribute value information following the present method (e.g. a level 1 hierarchical attribute value information and a level 2 hierarchical attribute value information). The three level hierarchy may, for example, involve data blocks (level 1) (e.g. b1-bN), sub-blocks (level 2) (e.g. sb1-sb4) for each block, and sub-sub-blocks (level 3) for the sub-blocks. For example, the level 1 hierarchical attribute value information may be associated with the data blocks, and the level 2 hierarchical attribute value information may be associated with the sub-blocks. In the largest unit, the level 1 hierarchical attribute value information, the bit vectors indicate which level 2 hierarchical attribute value information need to be looked at. As the set of values that can occur in the lower-level data blocks (level 2 and level 3) is defined by the level 1 hierarchical attribute value information, the value set of the distinct values itself does not need to be repeated. Thus, the level 2 hierarchical attribute value information may consist of an array of bit vectors only, similar to the ones depicted on FIG. 2, indicating the sub-sub-blocks. The first bit vector corresponds to the first value, or 1-bit, of the Bloom filter, etc. A third level of the hierarchical attribute value information may not be required. In addition to that, the present method may be applied only to the lower levels of the hierarchy.

Aspects of the present invention are described herein with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for processing a data table, the data table having a set of attributes, the method comprising:
    storing the data table on one or more data blocks consisting of one or more sub-blocks, wherein the one or more data blocks comprise fixed value sets;
    determining distinct values of at least one attribute for the one or more sub-blocks relating to a respective data block of the one or more data blocks;
    storing information indicating the distinct values as hierarchical attribute value information for the respective data block, wherein the hierarchical attribute value information indicates a presence of the distinct values in the one or more sub-blocks, and wherein the hierarchical attribute value information further comprises extremum values, min, and max of the at least one attribute for the respective data block of the data table;
    mapping and encoding the distinct values of the hierarchical attribute value information into one or more bits of a Bloom filter vector using a hash function;
    augmenting a list of the distinct values by one or more bit vectors, wherein each of the distinct values are paired with the one or more bit vectors that indicate which of the one or more sub-blocks, of the one or more data blocks, contain the distinct values; and
    performing a bitwise AND operation over the one or more sub-blocks, wherein a resulting vector of the bitwise AND operation is used to iterate over each of the one or more sub-blocks to map the one or more sub-blocks to the resulting vector.

2. The computer-implemented method of claim 1, wherein the hierarchical attribute value information comprises an attribute information set for the respective data block and the one or more sub-blocks, wherein the attribute information set comprises the distinct values for the respective data block or the one or more sub-blocks.

3. The computer-implemented method of claim 1, wherein the hierarchical attribute value information for the respective data block of the data table comprises the Bloom filter vector as an indication of the distinct values, and wherein the hierarchical attribute value information is limited to the min/max range given by the extremum values of the hierarchical attribute value information.

4. The computer-implemented method of claim 3, further comprising:
    storing the Bloom filter vector in one or more respective processor registers; and
    processing content of the one or more respective processor registers for evaluating a query on the data table, wherein the query has a selection condition on the at least one attribute.

5. The computer-implemented method of claim 4, further comprising:
    deleting at least one bit vector, in response to determining that a predefined number of the one or more bits of the at least one bit vector for the respective data block are set.

6. The computer-implemented method of claim 5, wherein the predefined number of the one or more bits comprises the number of bits in the at least one bit vector for the respective data block.

7. The computer-implemented method of claim 1, wherein the hierarchical attribute value information of the respective data block of the data table comprises at least one bit vector in association with the distinct values of the respective data block, wherein the at least one bit vector comprises a bit for the one or more sub-blocks of the respective data block, the method further comprising:
    setting one or more bits, of the at least one bit vector, for indicating the presence of the distinct values in the one or more sub-blocks associated with the one or more bits.

8. The computer-implemented method of claim 1, wherein the respective data block of the data table comprises a predefined physical storage unit or a fixed number of records.

9. The computer-implemented method of claim 1, wherein the at least one attribute comprises a multi-value attribute, a first value and a second value, wherein the distinct values are distinct first values, and wherein the hierarchical attribute value information indicates the distinct first values and the one or more sub-blocks of the respective data block having a second value associated with the distinct first values.

10. The computer-implemented method of claim 1, wherein the distinct values of the hierarchical attribute value information are encoded into one or more bits of a bit vector, wherein the hierarchical attribute value information of the respective data block of the data table comprises the bit vector as an indication of the distinct values.

11. The computer-implemented method of claim 1, wherein the hierarchical attribute value information of the respective data block of the data table comprises a Bloom filter vector in association with the distinct values of the respective data block, the Bloom filter vector comprising one or more bits set for the one or more sub-blocks of the respective data block, the method further comprising:
    setting the one or more bits of the Bloom filter vector for indicating the presence of the distinct values in the one or more sub-blocks associated with the one or more bits.

12. The computer-implemented method of claim 1, further comprising:
    storing the Bloom filter vector in a single instruction multiple data (SIMD) register; and processing content of the SIMD register for evaluating a query on the data table, wherein the query has a selection condition on the at least one attribute.

13. A computer program product for processing a data table, the data table having a set of attributes, the computer program product comprising a computer readable storage medium having program instructions embodied therewith, the program instructions executable by an electronic device to cause the electronic device to perform a method comprising:

storing the data table on one or more data blocks consisting of one or more sub-blocks, wherein the one or more data blocks comprise fixed value sets;

determining distinct values of at least one attribute for the one or more sub-blocks relating to a respective data block of the one or more data blocks;

storing information indicating the distinct values as hierarchical attribute value information for the respective data block, wherein the hierarchical attribute value information indicates a presence of the distinct values in the one or more sub-blocks, and wherein the hierarchical attribute value information further comprises extremum values, min, and max of the at least one attribute for the respective data block of the data table;

mapping and encoding the distinct values of the hierarchical attribute value information into one or more bits of a Bloom filter vector using a hash function;

augmenting a list of the distinct values by one or more bit vectors, wherein each of the distinct values are paired with the one or more bit vectors that indicate which of the one or more sub-blocks, of the one or more data blocks, contain the distinct values; and performing a bitwise AND operation over the one or more sub-blocks, wherein a resulting vector of the bitwise AND operation is used to iterate over each of the one or more sub-blocks to map the one or more sub-blocks to the resulting vector.

14. The computer program product of claim 13, wherein the hierarchical attribute value information comprises an attribute information set for the respective data block and the one or more sub-blocks, wherein the attribute information set comprises the distinct values for the respective data block or the one or more sub-blocks.

15. The computer program product of claim 13, wherein the hierarchical attribute value information for the respective data block of the data table comprises the Bloom filter vector as an indication of the distinct values, and wherein the hierarchical attribute value information is limited to the min/max range given by the extremum values of the hierarchical attribute value information.

16. The computer program product of claim 13, wherein the hierarchical attribute value information of the respective data block of the data table comprises at least one bit vector in association with the distinct values of the respective data block, wherein the at least one bit vector comprises a bit for the one or more sub-blocks of the respective data block, the method further comprising:

setting one or more bits, of the at least one bit vector, for indicating the presence of the distinct values in the one or more sub-blocks associated with the one or more bits.

17. A system for processing a data table, the data table having a set of attributes, the system comprising a computer processor coupled to a computer-readable memory unit, the computer-readable memory unit comprising instructions that when executed by the computer processor implements a method comprising:

storing the data table on one or more data blocks consisting of one or more sub-blocks, wherein the one or more data blocks comprise fixed value sets;

determining distinct values of at least one attribute for the one or more sub-blocks relating to a respective data block of the one or more data blocks;

storing information indicating the distinct values as hierarchical attribute value information for the respective data block, wherein the hierarchical attribute value information indicates a presence of the distinct values in the one or more sub-blocks, and wherein the hierarchical attribute value information further comprises extremum values, min, and max of the at least one attribute for the respective data block of the data table;

mapping and encoding the distinct values of the hierarchical attribute value information into one or more bits of a Bloom filter vector using a hash function;

augmenting a list of the distinct values by one or more bit vectors, wherein each of the distinct values are paired with the one or more bit vectors that indicate which of the one or more sub-blocks, of the one or more data blocks, contain the distinct values; and performing a bitwise AND operation over the one or more sub-blocks, wherein a resulting vector of the bitwise AND operation is used to iterate over each of the one or more sub-blocks to map the one or more sub-blocks to the resulting vector.

18. The system of claim 17, wherein the hierarchical attribute value information comprises an attribute information set for the respective data block and the one or more sub-blocks, wherein the attribute information set comprises the distinct values for the respective data block or the one or more sub-blocks.

19. The system of claim 17, wherein the hierarchical attribute value information for the respective data block of the data table comprises the Bloom filter vector as an indication of the distinct values, and wherein the hierarchical attribute value information is limited to the min/max range given by the extremum values of the hierarchical attribute value information.

20. The system of claim 17, wherein the hierarchical attribute value information of the respective data block of the data table comprises at least one bit vector in association with the distinct values of the respective data block, wherein the at least one bit vector comprises a bit for the one or more sub-blocks of the respective data block, the method further comprising:

setting one or more bits, of the at least one bit vector, for indicating the presence of the distinct values in the one or more sub-blocks associated with the one or more bits.

* * * * *